United States Patent [19]
Davis, Jr. et al.

[11] Patent Number: 5,839,000
[45] Date of Patent: Nov. 17, 1998

[54] AUTOMATIC ZOOM MAGNIFICATION CONTROL USING DETECTION OF EYELID CONDITION

[75] Inventors: Thomas Daniel Davis, Jr., Camas, Wash.; Larry Alan Westerman, Portland, Oreg.

[73] Assignee: Sharp Laboratories of America, Inc., Camas, Wash.

[21] Appl. No.: 967,684

[22] Filed: Nov. 10, 1997

[51] Int. Cl.⁶ .................................................. G03B 17/00
[52] U.S. Cl. ................................................ 396/51; 396/77
[58] Field of Search .................................. 396/51, 77, 62, 396/382, 374, 72; 348/240, 358, 333

[56] References Cited

U.S. PATENT DOCUMENTS

| | | |
|---|---|---|
| 5,333,029 | 7/1994 | Uchiyama et al. . |
| 5,335,035 | 8/1994 | Maeda ........................................ 396/51 |
| 5,422,700 | 6/1995 | Suda et al. . |
| 5,515,130 | 5/1996 | Tsukahara et al. . |
| 5,581,323 | 12/1996 | Suzuki et al. . |
| 5,623,703 | 4/1997 | Takagi et al. . |
| 5,737,641 | 4/1998 | Kobayashi ................................ 396/51 |

OTHER PUBLICATIONS

Takami et al., *Computer interface to use head and eyeball movement for handicapped people*, Proceedings of the 1995 IEEE International Conference on Systems, Man and Cybernetics, Part 2 of 5, v2, Oct. 22–25, 1995.

Abou–Ali and Porter, *Man–machine interface through eyeball direction of gaze*, Proceedings of the 1997 29th Southeastern Symposium on System Theory, Mar. 9–11, 1997.

*Primary Examiner*—W. B. Perkey
*Attorney, Agent, or Firm*—Robert D. Varitz, P.C.

[57] ABSTRACT

The apparatus is designed to adjust the zoom magnification control of a camera having a variable-magnification device, and includes a camera optical system for converting a scene into an image, a view finder for displaying said image to a user, a zoom control for changing the focal length of the lens, a detector coupled to the view finder for detecting a zoom condition of the user's face, and an analysis system for analyzing the detected zoom condition and for generating an input signal to the zoom control to change the focal length of the lens as a function of the zoom condition of the user's face.

The method includes the steps of converting a scene into an image using a camera optical system; displaying the image to a user; detecting a zoom condition of the user's face with a zoom-condition detector; analyzing the detected zoom condition of the user's face; and generating an input signal to a zoom control for changing the focal length of the lens as a function of the zoom condition of the user's face.

17 Claims, 2 Drawing Sheets

AUTOMATIC ZOOM MAGNIFICATION CONTROL USING DETECTION OF EYELID CONDITION

FIELD OF THE INVENTION

This invention relates to the control of an optical apparatus or image display system, and specifically, to a system and method of controlling selective zoom, or magnification, automatically in response to reflexive movements of the user's face, such as squinting.

BACKGROUND OF THE INVENTION

A number of systems are known which address the problem of indirect control of optical or image display systems. In many of these systems, focus and/or panning are under automatic control based upon observation of the eye(s) and detection of eye gaze direction. However, no such system is known which incorporates zoom or magnification adjustment under automatic (hands-off) control, while preserving direction of gaze. The ability to look at an object of interest and selectively magnify the view of that object is extremely useful in a number of situations, such as examining documents on a workstation screen, or composing and capturing a picture in a camera viewfinder.

U.S. Pat. No. 5,333,029, to Uchiyama et al. for "Camera capable of detecting eye-gaze" describes a camera which performs automatic focusing based upon the direction of eye gaze.

U.S. Pat. No. 5,422,700, to Suda, et al. for "Camera in which focus is detected to a plurality of viewfields within a observation block which is selected by visual axis detecting means" also describes a camera which performs automatic focusing based upon the direction of eye gaze.

U.S. Pat. No. 5,515,130, to Tsukahara et al. for "Camera control device" describes a camera which performs automatic focusing, taking into account the magnification of each area at which the eye is directed, based upon focal length setting of the lens.

U.S. Pat. No. 5,581,323, to Suzuki et al. for "Optical apparatus for controlling operations based on a users visual axis" describes a system which determines visual axis, and determines whether user is in fact looking into the camera viewfinder.

U.S. Pat. No. 5,623,703 to Takagi et al. for "Camera capable of detecting eye-gaze" describes a system automatically using the viewer's automatic eye-gaze to control camera focus.

In addition to the above-referenced patents, systems using eye gaze direction to control computer interfaces are described in technical publications. For example, Takami et al., *Computer interface to use head and eyeball movement for handicapped people*, Proceedings of the 1995 IEEE International Conference on Systems, Man and Cybernetics, Part 2 of 5, v2, Oct. 22–25, 1995; and Abou-Ali and Porter, *Man-machine interface through eyeball direction of gaze*, Proceedings of the 1997 29th Southeastern Symposium on System Theory, Mar. 9–11, 1997. In all of the cited references, control is based on direction of gaze, rather than on reflexive attempts at improving resolution of a specific region of the visual field.

SUMMARY OF THE INVENTION

The apparatus of the invention is designed to adjust the zoom magnification control of an optical system having a variable-magnification device, and includes an image processing subsystem for converting a source image, or scene into a processed image, a view finder or display for displaying the processed image to a user, a zoom control for changing the magnification of the variable-magnification device, a zoom-condition detector for detecting a zoom condition of the user's face, and an analysis subsystem for analyzing the detected zoom condition and for generating an input signal to the zoom control to change the magnification of the variable-magnification device as a function of the zoom condition of the user's face. The image processing subsystem then modifies the processed image accordingly.

The method of the invention provides a way to adjust the zoom magnification control of an optical system having a variable-magnification device, and includes the steps of converting a source image into a processed image using an image processing subsystem; displaying the processed image to a user; detecting a zoom condition of the user's face with a zoom-condition detector; analyzing the detected zoom condition of the user's face; and generating an input signal to a zoom control for changing the magnification of the variable-magnification device as a function of the zoom condition of the user's face, and modifying the processed image accordingly.

The zoom condition reflex of the user's face may be monitored by a mechanism similar to that used to measure eye gaze, and may reliably represent a parallel input to the system under control, while preserving the direction of eye gaze, in contradistinction to present systems which would typically require a redirection of gaze to effect magnification or minification of an image. The optical system and method of the invention may be used on a video or still camera, on a computer or television display, or may be coupled with various other optical devices, such as medical optical devices.

An object of this invention is to create an automatic mechanism for controlling magnification or zoom, based upon a natural reflexive reaction of the user's face.

Another object of the invention is to provide an automatic mechanism for controlling magnification or zoom based on squinting as the user attempts to discern greater visual detail of a particular object.

A further object of the invention is to provide an automatic mechanism for controlling magnification or zoom which may be used in a video or still camera.

Yet another object of the invention is to provide an automatic mechanism for controlling magnification or zoom which may be used on a computer or television display.

Still another object of the invention is to provide an automatic mechanism for controlling magnification or zoom which may be used with medical optical devices.

These and other objects and advantages of the invention will become more fully apparent as the description which follows is read in conjunction with the drawings.

DETAILED DESCRIPTION OF THE PREFERRED EMBODIMENTS

Figure 1:
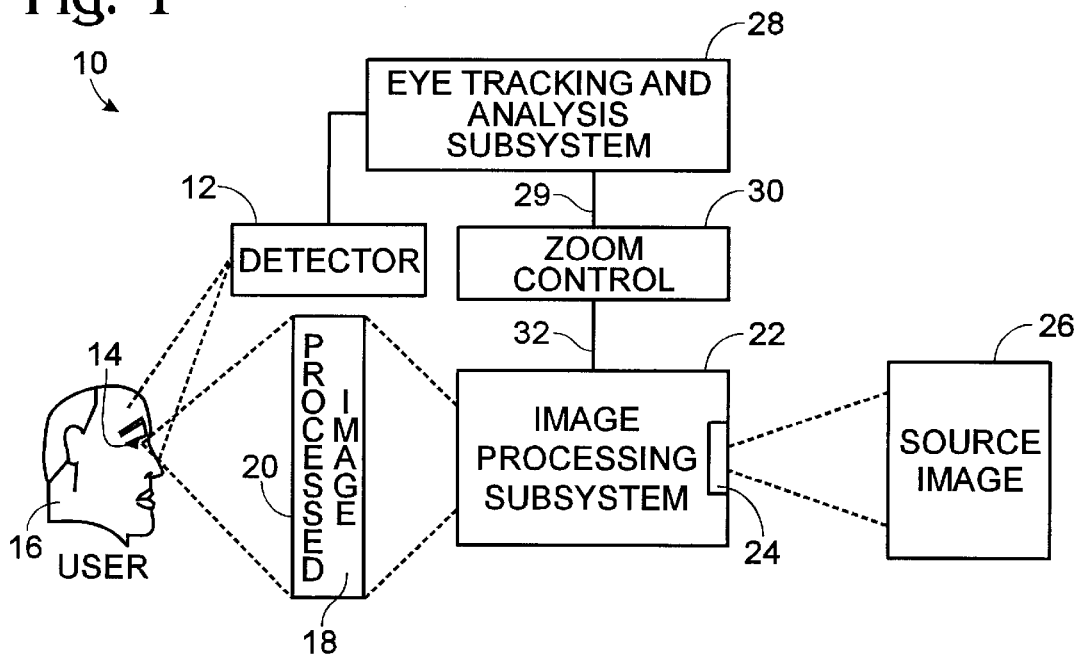
FIG. 1 is a block diagram of the apparatus of the invention.

Referring now to FIG. 1, the apparatus of the invention will be described. The optical system of the apparatus is depicted generally at 10, and includes a detector 12 which observes the eye 14 of a user 16, who is viewing a processed image 18 on a display device 20. Processed image 18 is generated by an image processing subsystem 22, which includes a variable-magnification device 24. A source image 26 is the subject for image processing subsystem 22. It will be appreciated that in the case where the system of the invention is incorporated into a camera, source image 26 is a scene observed by the user of the camera, and variable-magnification device 24 is a zoom lens.

Detector 12, at a minimum, observes the pupil, iris, conjunctiva and lids of at least one eye of user 16, the state of which is referred to herein as a zoom condition. The detector may be incorporated into an optical display system, such as a camera viewfinder, or computer monitor or television screen, or may be a stand-alone device that is associated with some form of optical display device. The condition detected by detector 12 is processed to derive the direction of gaze, using standard techniques, and a measure of lid position, for example, which is referred to herein as a "zoom condition" of the user's face, which may be the extent of the conjunctiva (white of the eye) which is visible (i.e., not occluded by the lids), the degree to which the eyelids are opened or closed, or a qualitative bioelectric measure of a specific facial muscle.

A simple calibration procedure permits an analysis subsystem 28 to determine the normal position of the eyelids, and to generate an input signal 29 to a zoom control 30 when the lids are partially closed relative to the normal position and held in the partially closed position for longer than a predetermined time period. Such movement of the lids may be reflexive, or the movement may be a conscious act by the user to control magnification of the system. In either case, such movement is indicative of an attempt by the user to selectively focus upon a particular subject in the current line of sight. The input signal causes zoom control 30 of the optical system or image display system to generate a zoom signal 32, which results in a change in the magnification of variable-magnification device 24 based upon the portion of the source image at the center of gaze.

Figure 2:
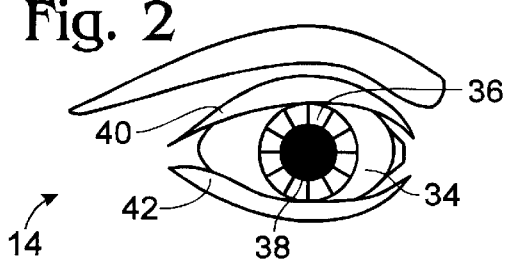
FIG. 2 depicts a user's eye in a normal condition.
Figure 3:
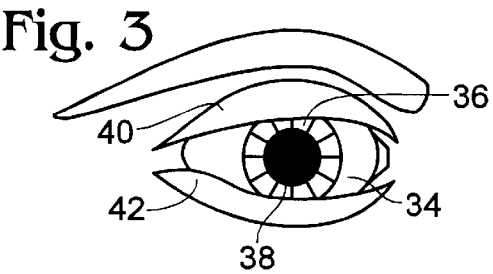
FIG. 3 depicts a user's eye in a squinted condition.
Figure 4:
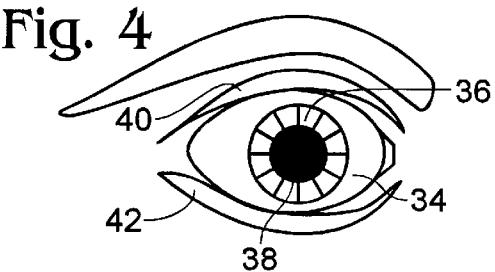
FIG. 4 depicts a user's eye in a wide-open condition.

Referring now to FIG. 2, an eye 14 is depicted in a normal condition, wherein conjunctiva 34 is visible on each side of iris 36 and pupil 38. Upper eyelid 40 and lower eyelid 42 are seen to allow full view of iris 36. In FIG. 3, eye 14 is in a squinted condition, wherein upper eyelid 40 and lower eyelid 42 partially occlude iris 36. Eye 14 in FIG. 4 is in a fully open condition, with upper eyelid 40 and lower eyelid 42 pulled back to allow view of conjunctiva 34 above and below iris 36. System 10, and specifically analysis subsystem 28 provides for a "learning" feature, wherein system 10 learns what constitutes a normal condition of the user's eye, and adjusts the magnification of the source image according to changes from the normal condition.

Figure 5:
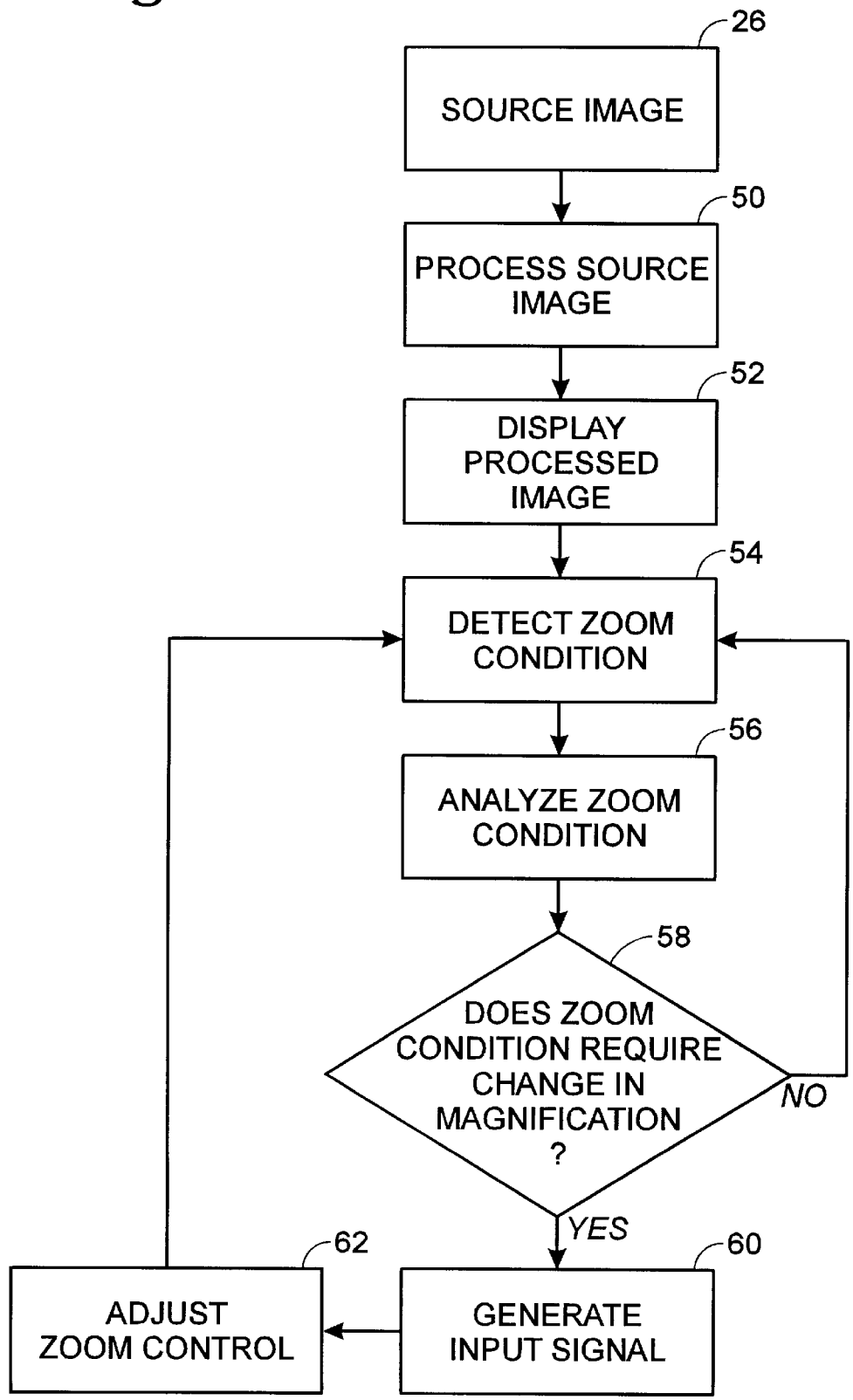
FIG. 5 is a block diagram depicting the method of the invention.

Referring now to FIG. 5, the method of the invention will be described. Image processing subsystem 22 processes source image 26, block 50. The processed image is then displayed, block 52, on display device 20. Detector 12 detects the zoom condition, block 54, of the user's face. The zoom condition is analyzed, block 56, by analysis subsystem 28. Analysis subsystem 28 determines whether the zoom condition requires a change in magnification, block 58. If the answer is "NO", detector 12 again detects zoom condition until such time as the zoom condition requires a change in magnification, constituting a "YES" answer to block 58. When there is a requirement to change magnification, analysis subsystem 28 sends an appropriate input signal 29 to zoom control 30, block 60, which in turn generates a zoom signal 32, which zoom signal changes the magnification of variable magnification device 24, block 62.

Various facial reflexive or conscious conditions may be used as the zoom condition. In one form of the invention, the apparatus includes a detector located in a camera viewfinder, which is trained on the face or eye of the user while viewing the processed image. Known detection algorithms require that a detector provide an image of the user's face to the analysis subsystem, and such detection is used with this optical system. Analysis subsystem 28 extracts from detector 12 the direction of gaze and the state of openness of the user's eyelids. The zoom control is capable of adjusting the degree of magnification or minification of the image processing subsystem and therefore the processed image presented to the user. Analysis subsystem 28 determines when the eyelids are moved from the normal, resting state, shown in FIG. 2, to a more-fully-closed state, without being fully closed, shown in FIG. 3, and held in that state for a period of time exceeding a predetermined time period, typically one-half second, and also determines that the gaze is steady. When these events occur simultaneously, analysis subsystem 28 determines that the user is attempting to more closely view the object(s) at the direction of gaze, and sends an input signal 29 to zoom control 30, which in turn sends a zoom signal 32 to image processing subsystem 22, and variable magnification device 24, which causes an increase in the magnification of the processed image presented to the user.

In another embodiment, the analysis subsystem determines when the eyelids are moved from the resting state (FIG. 2) to a more-fully-open state (FIG. 4), and held in that state for a period of time exceeding a predetermined time period. When this event occurs, analysis subsystem 28 determines that the user wishes to reduce the magnification of the image, and sends an input signal 29 to zoom control 30, which causes a decrease in the magnification of the processed image presented to the user.

The analysis subsystem may also be programmed to respond to a zoom condition when the eyelids are held closed for a period of time exceeding a predetermined time period. When this event occurs, analysis subsystem 28 determines that the user wishes to reduce the magnification of the image, and sends an input signal 29 to the zoom control 30, which causes a decrease in the magnification of the processed image presented to the user. The analysis subsystem may also be programmed to a variety of combinations of facial movements, according to a particular training paradigm. For instance, the position of the eyelids may be determined by mechanical measurement of the eyelid position; the position of the eyelids may be determined by measurement of bioelectric measurement of the contraction of facial muscles; the position of the eyelids may be determined by other optical means which do not require the creation of an image of the face.

The optical system may be incorporated into an apparatus including an image display device, such as a television or computer display monitor. In this embodiment, an input signal to increase magnification will cause zoom control 30 to alter the display in such a way as to enlarge the area of the image around the direction of gaze, and to re-center that portion of the image on the screen. Such a system may be particularly useful in a CAD/CAE environment, or in a medical environment. A surgeon performing micro-surgery will be able to adjust the magnification of the object being operated on without requesting assistance from other operating room personnel.

Thus, an apparatus and method for changing the focal length of a variable-length camera lens has been disclosed.

It will be appreciated that further variations and modifications may be made thereto without departing from the scope of the invention as defined in the appended claims.

We claim:

1. An apparatus for adjusting zoom magnification control of an optical system having a variable-magnification device, comprising:

an image processing subsystem for generating a processed image;

an image display for displaying said processed image to a user;

a zoom control for changing the magnification of the variable-magnification device;

a detector coupled to said image display for detecting a zoom condition of the user's face;

an analysis system for analyzing the detected zoom condition and for generating an input signal to said zoom control to change the magnification of the variable-magnification device as a function of the zoom condition of the user's face, wherein said zoom condition is the extent of the conjunctiva of the user's eye visible to said detector.

2. The apparatus of claim 1 wherein said detector is an optical device that is trained on the user's eye.

3. The apparatus of claim 1 wherein said image display is a camera view finder.

4. The apparatus of claim 1 wherein said image display is a video display device.

5. The apparatus of claim 1 wherein said zoom condition is a closing of the user's eyelids.

6. The apparatus of claim 1 wherein said zoom condition is an opening of the user's eyelids.

7. The apparatus of claim 1 wherein the optical system is located in a camera.

8. A method for adjusting zoom magnification control of an optical system having a variable-magnification device, comprising:

processing a source image into a processed image using an image processing subsystem;

displaying the processed image to a user;

detecting a zoom condition of the user's with a zoom-condition detector, wherein said zoom condition is the extent of the conjunctiva of the user's eye visible to said detector;

analyzing the detected zoom condition of the user's face; and generating an input signal to a zoom control for changing the magnification of the variable-magnification device as a function of the zoom condition of the user's face.

9. The method of claim 8 wherein said displaying is performed on a display separate from the optical system.

10. The method of claim 8 wherein said displaying is performed on a display that is part of the optical system.

11. The method of claim 8 wherein said detecting includes detecting the extent of closing of the user's eyelids.

12. The method of claim 8 wherein said detecting includes the extent of opening the user's eyelids.

13. The method of claim 8 wherein the optical system is part of a camera.

14. An apparatus for adjusting zoom magnification control of an optical system having a variable-magnification device comprising:

an image processing subsystem for generating a processed image;

an image display for displaying said processed image to a user;

a zoom control for changing the magnification of the variable-magnification device;

a detector, including a bioelectric measurement device, coupled to said image display for detecting a zoom condition of the user, wherein the zoom condition is a bioelectric measurement of the contraction of a predetermined muscle;

an analysis system for analyzing the detected zoom condition and for generating an input signal to said zoom control to change the magnification of the variable-magnification device as a function of the zoom condition of the user.

15. The apparatus of claim 14 wherein the optical system is located in a camera.

16. A method for adjusting zoom magnification control of an optical system having a variable-magnification device, comprising:

processing a source image into a processed image using an image processing subsystem;

displaying the processed image to a user;

detecting a zoom condition of the user with zoom-condition detector, wherein said detecting includes detecting the bioelectric measurement of the contraction of a predetermined muscle;

analyzing the detected zoom condition of the user; and generating an input signal to a zoom control for changing the magnification of the variable-magnification device as a function of the zoom condition of the user.

17. The method of claim 16 wherein the optical system is a part of a camera.

* * * * *